US010420965B1

(12) United States Patent
Dykes

(10) Patent No.: US 10,420,965 B1
(45) Date of Patent: Sep. 24, 2019

(54) DIRECTIONAL INDICATOR FOR PROTECTIVE FACE MASKS

(71) Applicant: Jeffrey L. Dykes, Eau Claire, WI (US)

(72) Inventor: Jeffrey L. Dykes, Eau Claire, WI (US)

( * ) Notice: Subject to any disclaimer, the term of this patent is extended or adjusted under 35 U.S.C. 154(b) by 0 days.

(21) Appl. No.: 16/058,637

(22) Filed: Aug. 8, 2018

Related U.S. Application Data

(63) Continuation-in-part of application No. 15/533,288, filed as application No. PCT/US2015/064318 on Dec. 7, 2015, now Pat. No. 10,058,721.

(60) Provisional application No. 62/124,012, filed on Dec. 5, 2014.

(51) Int. Cl.
| | |
|---|---|
| A62B 9/00 | (2006.01) |
| G02B 27/01 | (2006.01) |
| B63C 11/12 | (2006.01) |
| A42B 3/22 | (2006.01) |
| A62B 18/08 | (2006.01) |
| G08B 21/08 | (2006.01) |
| G01C 21/16 | (2006.01) |
| G08B 5/36 | (2006.01) |

(52) U.S. Cl.
CPC .............. *A62B 9/006* (2013.01); *A42B 3/225* (2013.01); *A62B 18/08* (2013.01); *G02B 27/017* (2013.01); *G02B 27/0176* (2013.01); *B63C 2011/121* (2013.01); *G01C 21/16* (2013.01); *G08B 5/36* (2013.01); *G08B 21/08* (2013.01)

(58) Field of Classification Search
CPC ...... A62B 9/006; A62B 18/08; G02B 27/017; G02B 27/0176; B63C 2011/121; B63C 11/12
USPC ....................................... 340/691.8
See application file for complete search history.

(56) References Cited

U.S. PATENT DOCUMENTS

| | | | | |
|---|---|---|---|---|
| 8,860,570 | B2 * | 10/2014 | Thomas | G06F 19/3418 340/539.12 |
| 10,058,721 | B2 * | 8/2018 | Dykes | A62B 9/006 |
| 2007/0024581 | A1 * | 2/2007 | Kim | G01C 21/16 345/156 |
| 2012/0000465 | A1 * | 1/2012 | Cavaliere | A62B 9/006 128/202.27 |
| 2013/0024117 | A1 * | 1/2013 | Pavetti | G01C 21/16 701/538 |
| 2014/0236479 | A1 * | 8/2014 | Janardhanan | G01C 21/165 701/512 |

* cited by examiner

*Primary Examiner* — John A Tweel, Jr.
(74) *Attorney, Agent, or Firm* — Underwood & Associates, LLC

(57) ABSTRACT

An electronic directional indicator includes a microcontroller in electronic communication with an electronic compass, an electronic motion-detecting module and at least one light source that is controllably illuminable. A battery life of the electronic directional indicator is managed by monitoring the electronic motion-detecting module for motion within pre-defined time periods and reducing power to electronic components accordingly. The electronic directional indicator can be placed on the face shield portion of a self-contained breathing apparatus face mask to provide a constant source of orientation for firefighters in reduced- or zero-visibility environments.

21 Claims, 9 Drawing Sheets

192

US 10,420,965 B1

DIRECTIONAL INDICATOR FOR PROTECTIVE FACE MASKS

CROSS REFERENCE TO RELATED APPLICATIONS

Continuation-in-part of U.S. application Ser. No. 15/533,288, filed Jun. 5, 2017, which is a National Stage of PCT/US2015/064318, filed Dec. 7, 2015, which claims priority to, and the benefit of U.S. Provisional Patent Application No. 62/124,012, filed on 5 Dec. 2014. Each of the foregoing applications is expressly incorporated herein by reference.

TECHNICAL FIELD

This disclosure relates to a directional indicator for a protective face mask. In particular, this disclosure relates to a directional indicator for the face mask portion of a self-contained breathing apparatus (SCBA) which is configured to provide visual indication of a direction, e.g., N, S, E, W to a wearer of the face mask, such as a firefighter.

BACKGROUND

SCBA's are commonly used among personnel such as firefighters to protect them from exposure to harmful atmospheres and other dangers. A typical SCBA usually includes at minimum a cylinder of compressed breathing air and a face mask, with an air hose running therebetween. The face mask component of a SCBA commonly includes adjustable webbing or straps that are configured to be worn about the head in such a way as to create a tight seal between the face mask and the wearer's face. In many SCBA systems, positive air pressure is maintained within the area between the wearer's face and the face shield to help keep harmful atmospheric elements from being inhaled.

While an SCBA can protect firefighters' lungs from so-called 'immediately dangerous to life and health' (IDLH) atmospheres, the unpredictability of fire growth and spread remains one of the most perilous factors in the profession. The contents of common household and business dwellings are being manufactured with increasing amounts of petroleum products, which leads to the evolution of dark, black smoke, especially during the growth stage of a fire. Rapid fire growth coupled with the production of dense smoke can result in a complete loss of visibility within a structure in a very short time.

Even the most experienced firefighters can succumb to disorientation within reduced-visibility environment, sometimes with perilous outcomes. For example, a firefighting crew may need to evacuate quickly along a planned evacuation route due to changing circumstances, rapidly-evolving fire, or an imminent flashover. In these cases, maintaining orientation to features of the structure (entrance doors, windows, etc.) can be critical. Likewise, SCBA cylinders carry a fixed volume of air, typically enough to work in an IDLH atmosphere for 30-45 minutes, so firefighters are trained to monitor their air reserves and retreat when necessary. Disorientation can result in a firefighter remaining in an IDLH atmosphere for a time period beyond that which their SCBA can sustain their breathing air supply, resulting in a high probability of injury or death.

While there is currently an SCBA available that includes a full see-through augmented reality display, as disclosed in U.S. Pat. No. 7,110,013, the display is complicated, requiring special training on the part of the firefighter that will be using the display, and, due to the components included, expensive to procure. As such, there is an existing need for a directional indicator that is simple for the user to operate, inexpensive, and that may be attached to an existing face mask of a SCBA.

Likewise, there are currently separate compasses that may be carried externally by a firefighter or similar user, such as the Fireground Compass™ by Halcyon Products, Inc. However, such products must be carried externally, adding to the separate pieces of equipment that the firefighter must carry, which means that they are often left in the firefighter's truck. Additionally, since they are carried externally, there may be a delay as the firefighter locates the compass, brings it to a location that the firefighter can see it, and then reads the compass. Furthermore, in 'zero-visibility' environments, such a compass may be wholly unusable for its intended purpose. Furthermore yet, firefighters often wear thick gloves which can make obtaining and operating a hand-held compass cumbersome and unmanageable. As such, there is also an existing need for a directional indicator that may be attached to and integrated with an existing face mask of a SCBA.

SUMMARY

In a first exemplary aspect, a portable electronic directional indicator device is provided. The portable electronic directional indicator device includes a main body, itself including front and rear sides, wherein the front side includes at least one directional indicator. The portable electronic directional indicator device further includes a power source, at least one light source configured to controllably illuminate the directional indicator, an electronic compass module configured to determine a directionality of the portable directional indicator device, an electronic motion-detecting module configured for detecting motion of the portable directional indicator device, and a microcontroller in electronic communication with the electronic compass module and the motion-detecting module. The microcontroller is configured to control an operational aspect of the at least one light source or the electronic compass based on one or more signals received from the electronic motion-detecting module.

In one embodiment, the portable electronic directional indicator device further includes a light sensor configured to measure a level of ambient light received through a window disposed on the main body. In a related embodiment, the microcontroller is configured to control an output intensity of the at least one light source based upon a measured level of ambient light. In another related embodiment, the microcontroller is configured to control an output color of the at least one light source based upon a measured level of ambient light. In yet another related embodiment, the portable electronic directional indicator device further includes a circuit board supporting at least the microcontroller, and a gasket member disposed between the circuit board and the front side. The gasket member includes at least one aperture to provide light communication between the light source and the at least one directional indicator, and at least one aperture to provide light communication between the light sensor and the environment outside of the portable electronic directional indicator device.

In one embodiment, the operational aspect of the electronic compass is power consumption. In a related embodiment, the operational aspect of the electronic compass is one of: a low-power, standby mode; a reduced-power, slow mode; and a full-power, active mode.

In a second exemplary aspect, an electronic directional indicator is provided. The electronic directional indicator includes a protective housing having a rear side configured to attach the electronic directional indicator to a shield, and a front side. The front side includes a first plurality of individually-illuminable directional indicium corresponding to a number of compass directions equal to the first plurality. The electronic directional indicator further includes a microcontroller disposed on a circuit board within the protective housing that is configured to receive a directional measurement from an electronic compass module and activate an individually-controllable light source assigned to a unique compass direction that is associated with, and disposed proximal to a corresponding one of the first plurality of individually-illuminable directional indicium. The microcontroller is further configured to control power consumption to at least one of the electronic compass and each of the individually-illuminable light sources based upon signals received by an accelerometer in electronic communication with the microcontroller.

In one embodiment, the shield is a face shield of a self-contained breathing apparatus face mask.

In one embodiment, the microcontroller is configured to differentiate one or more accelerometer signals corresponding to an activation motion sequence versus a time-averaged accelerometer motion signal level value. In a related embodiment, the activation motion sequence is motion engendered to the accelerometer through a tapping motion.

In one embodiment, the microcontroller is configured to reduce available power to at least one of the electronic compass and each of the individually-illuminable light sources if an accelerometer signal has not been received by the microcontroller within a predefined time period.

In one embodiment, the microcontroller is configured to reduce available power to at least one of the electronic compass and each of the individually-illuminable light sources if an accelerometer signal of a predefined signal type has not been received by the microcontroller within a predefined time period. In a related embodiment, the accelerometer signal of a predefined signal type is one corresponding to crawling motion, substantially continuous motion while the electronic compass is oriented at a predefined range of tilt angles, or substantially continuous activity by a wearer of the directional indicator.

In one embodiment, the protective housing includes a first half including the rear side, and a second half including the front side, wherein each of the first and the second half are reversibly engageable through a twist-lock mechanism, and the rear side or the front side is configured to receive the circuit board in a predetermined orientation. In this embodiment, when the first and the second half are engaged into an operational configuration, each of the individually-controllable light sources is necessarily aligned with its corresponding one of a plurality of illuminable directional indicia.

In one embodiment, the electronic directional indicator further includes a compressible gasket confrontationally disposed between the circuit board and the front side. The compressible gasket includes an aperture per each individually-illuminable light source configured to substantially block light from illuminating a directional indicium adjacent to the directional indicium to which the individually-illuminable light source is assigned.

In one embodiment, the electronic directional indicator further includes a light sensor configured to measure a level of ambient light outside of the protective housing. The microcontroller is further configured to reduce an output intensity, control an output color, or both, of each of the individually-illuminable light sources based on a measured level of ambient light.

In a third exemplary aspect, a method for providing a direction indication within a protective mask is disclosed. The method includes providing an electronic compass configured to determine a heading direction, an accelerometer, at least one directional indicator and a microcontroller. The method further includes configuring the microcontroller to receive the heading direction and illuminate one of the at least one directional indicators corresponding with the compass direction of the heading direction. The microcontroller is configured to continue providing a direction indication as long as a motion signal is received by the accelerometer within a predefined time period.

In one embodiment, the method further includes configuring the microcontroller to reduce power consumption of at least one of the electronic compass and the directional indicator based on a measured accelerometer value.

In one embodiment, the method further includes providing a light source and configuring the microcontroller to control an output intensity of the directional indicator based on a measured ambient light value.

In a fourth exemplary aspect, a directional indicator includes a microcontroller in signal communication with at least an electronic compass and an accelerometer. The indicator further includes a plurality of individually-actuatable light sources arranged such that the position of each light source represents a unique compass direction. Each of the light sources is actuatable by the microcontroller to controllably emit light. The indicator further includes at least one power source providing power to at least the microcontroller, and a shock sensor in signal communication with the accelerometer.

In one embodiment, the directional indicator is operable to toggle between a low- or no-power, standby mode and a full-power, operating mode. At least one of the microcontroller, the electronic compass and the accelerometer can be powered off after a selected time interval of inactivity as measured by the accelerometer. In an alternative embodiment, each of the microcontroller, the electronic compass and the accelerometer can be powered off after a selected time interval of inactivity as measured by the accelerometer.

In one embodiment, the shock sensor is configured to send or otherwise provide a wake-up signal to the accelerometer upon receiving a percussive shock when the directional indicator is in the standby mode. For example, a tap by a user's finger can be a percussive shock suitable to cause the shock sensor to send the wake-up signal to the accelerometer. The wake-up signal can cause the accelerometer to switch from the standby mode to the operating mode. Furthermore, the accelerometer can remain in the operating mode for a preselected time interval after receiving the wake-up signal. If movement of the directional indicator is measured by the accelerometer within the preselected time interval, the directional indicator can toggle to the full-power, operating mode, wherein at least the microcontroller, the electronic compass and the accelerometer can become fully operative. However, if no movement signals are generated by the accelerometer within the preselected time interval, the accelerometer can be powered off and the directional indicator can revert to the standby mode. The preselected time interval can be, for example, and without limitation: between 0 seconds and about 30 seconds; between 0 seconds and about 60 seconds; between 0 seconds and about 120 seconds; or between 0 seconds and about 180 seconds.

In one embodiment, the directional indicator further includes a rear housing portion and a front housing portion reversibly engaged to one another so as to encapsulate at least the microcontroller in a waterproof configuration. The rear housing portion can include a slanted surface for attachment to an inner surface of a facemask, wherein the slant of the surface of the rear housing portion is sufficient to orient the front housing portion substantially normal to a wearer's face when in use. The front housing portion can include an aperture for each light source, for allowing light emitted from the light sources to be visible from the exterior of the directional indicator. In another embodiment, the front housing portion can include a number of integral, transparent or translucent windows equal to the number of light sources for allowing light emitted from the light sources to be visible from the exterior of the directional indicator. Each of the transparent or translucent windows can be formed as a shape that indicates the unique compass direction associated with the light source immediately adjacent thereto.

In one embodiment, the microcontroller can be configured to receive a heading direction signal from the electronic compass corresponding to the direction the directional indicator is pointing and activate at least one of the light sources corresponding to the heading direction.

In a fifth exemplary aspect, a directional indicator includes a microcontroller in signal communication with at least an electronic compass and an accelerometer, a display, in signal communication with the microcontroller, operable to show indicia corresponding to a heading direction of the directional indicator determined by the electronic compass, at least one power source providing power to at least the microcontroller, and a shock sensor in signal communication with the accelerometer.

In one embodiment, the directional indicator is operable to toggle between a low- or no-power, standby mode and a full-power, operating mode. In one embodiment, the shock sensor is configured to send a wake-up signal to the accelerometer upon receiving a percussive shock when the directional indicator is in the standby mode.

In a sixth exemplary aspect, a directional indicator includes a microcontroller in signal communication with at least an electronic compass and an accelerometer, a plurality of individually-actuatable light sources arranged such that the position of each light source represents a unique compass direction, wherein each of the light sources is actuatable by the microcontroller to controllably emit light, at least one power source providing power to at least the microcontroller, and a shock sensor in signal communication with the accelerometer.

In one embodiment, the directional indicator is operable to toggle between a powered-down, standby or sleep mode and a full-power, operating mode. In a related embodiment, at least one of the microcontroller, the electronic compass and the accelerometer can be powered off after a selected time interval of inactivity as measured by the accelerometer. Alternatively, each of the microcontroller, the electronic compass and the accelerometer can be powered off after a selected time interval of inactivity as measured by the accelerometer. The shock sensor can send a wake-up signal to the accelerometer upon receiving a percussive shock when the directional indicator is in the powered-down, standby or sleep mode. For example, a tap by a user's finger is a percussive shock suitable to cause the shock sensor to send the wake-up signal to the accelerometer. Such a wake-up signal can cause the accelerometer to switch from the standby mode to the operating mode. The accelerometer can remain in the operating mode for a preselected time interval after receiving the wake-up signal. In one embodiment, if movement of the directional indicator is measured by the accelerometer within the preselected time interval, the directional indicator toggles to the full-power, operating mode, wherein at least the microcontroller, the electronic compass and the accelerometer are operative. In one embodiment, the movement is a predetermined confirmatory motion.

The predetermined confirmatory motion can be, e.g., a nodding motion of the head of a user, when the directional indicator is attached to an implement worn on the head of the user; one example of such an implement is a facemask or face shield.

In one embodiment, if no movement signals are generated by the accelerometer within the preselected time interval, the accelerometer is powered off and the directional indicator reverts to the standby mode. A preselected time interval can be, for example, between about 1 second and about 2 seconds; between about 1 second and about 4 seconds; or between about 1 second and about 10 seconds.

In one embodiment, directional indicator further includes a rear housing portion and a front housing portion reversibly engaged to one another so as to encapsulate at least the microcontroller in a waterproof configuration. The front housing portion can include an aperture for each light source, for allowing light emitted from the light sources to be visible from the exterior of the directional indicator. Alternatively, the front housing portion can include a number of integral, transparent or translucent windows equal to the number of light sources for allowing light emitted from the light sources to be visible from the exterior of the directional indicator. In one embodiment, each of the transparent or translucent windows can be formed as a shape that indicates the unique compass direction associated with the light source immediately adjacent thereto.

In one embodiment, the microcontroller is configured to receive a heading direction signal from the electronic compass corresponding to the direction the directional indicator is pointing and activate at least one of the light sources corresponding to the heading direction.

In a seventh exemplary aspect, a directional indicator includes a microcontroller in signal communication with at least an electronic compass and an accelerometer, a display, in signal communication with the microcontroller, operable to show indicia corresponding to a heading direction of the directional indicator determined by the electronic compass, at least one power source providing power to at least the microcontroller and a shock sensor in signal communication with the accelerometer.

In one embodiment, the directional indicator is operable to toggle between a low- or no-power, standby mode and a full-power, operating mode. The shock sensor can send a wake-up signal to the accelerometer upon receiving a percussive shock when the directional indicator is in the standby mode.

In an eighth exemplary aspect, a directional indicator includes a microcontroller in signal communication with at least an electronic compass and an accelerometer, a plurality of individually-actuatable light sources arranged such that the position of each light source represents a unique compass direction, wherein each of the light sources is actuatable by the microcontroller to controllably emit light, at least one power source providing power to at least the microcontroller, and a shock sensor in signal communication with the accelerometer.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

DESCRIPTION OF DRAWINGS

The present embodiments are illustrated by way of the figures of the accompanying drawings, which may not necessarily be to scale, in which like references indicate similar elements, and in which.

DETAILED DESCRIPTION OF ILLUSTRATIVE EMBODIMENTS

In general, a directional indicator (hereinafter DI) is provided. Without limitation, in a preferred embodiment the DI is configured for use with the face mask of an existing self-contained breathing apparatus (SCBA) and can be mounted thereon in any desired configuration or orientation. For example, a DI can be mounted on the inside or outside of the SCBA face shield in any desired location, preferably one which least impedes the user's visibility through the face shield portion of the face mask. In general, when used in cooperation with a SCBA face piece, DI's of the type described herein are configured to provide the user information of a direction that they are facing, e.g., a cardinal direction, using a display that can be quickly referenced and easily understood. Such information can provide the wearer a constant source of orientation information even in zero-visibility conditions.

Figure 1:
FIG. 1 illustrates a directional indicator disposed on an inside portion of an SCBA face shield, according to one embodiment.

Referring now to FIG. 1, a DI 100 is shown attached to a face shield (FS) portion of an SCBA face mask (M), according to one embodiment. FIG. 1 shows the DI 100 illustrated as a dashed circle to indicate that it is mounted on the inside of the face mask, although its placement is not so limited in this or other embodiments. In this example, the DI 100 is placed substantially between and above the user's eyes so as to minimize obstruction of view through the face shield. The DI 100 can be attached to the face shield using, e.g., an adhesive, which can provide for reversible attachment or, in other embodiments, through the use of fasteners or other, more permanent mounting methods.

Figure 2:
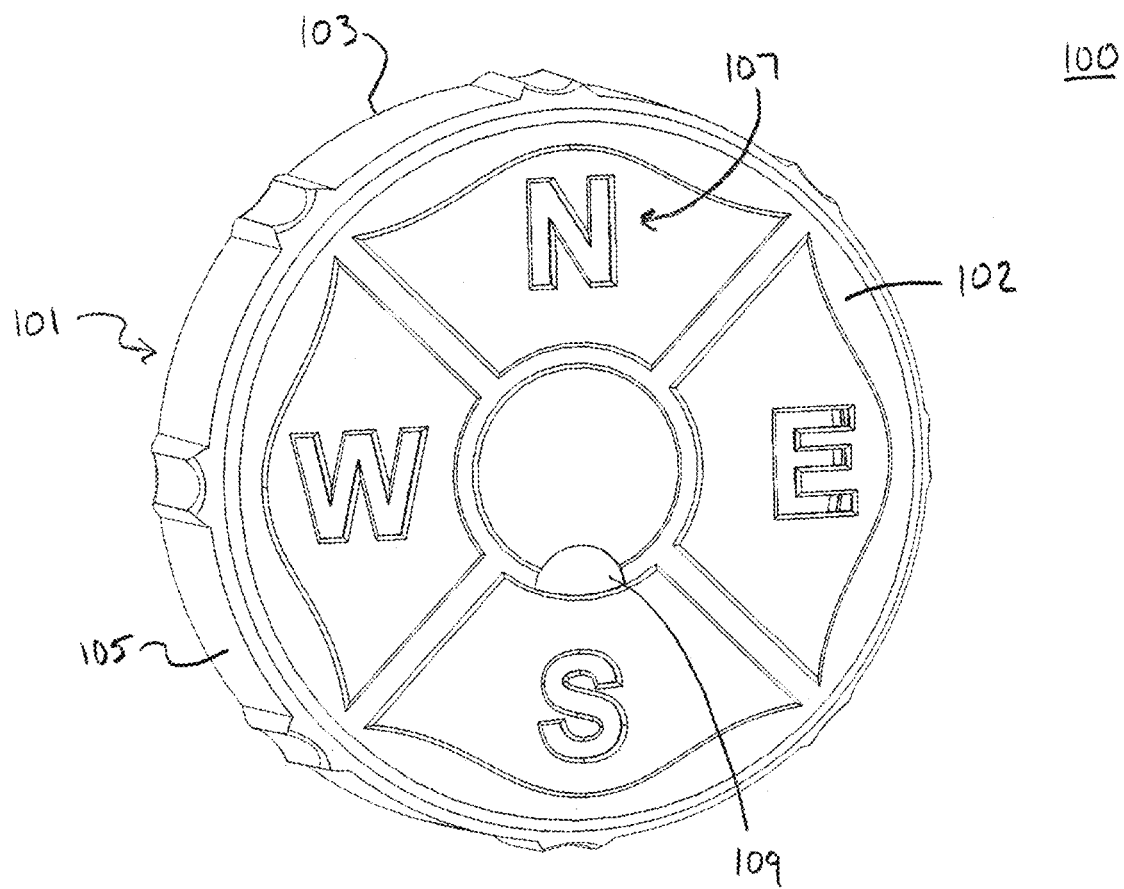
FIG. 2 is a directional indicator according to one embodiment.

Referring to FIG. 2, in this embodiment, the DI 100 includes a body 101 having front 102 and rear 103 sides, at least one directional indicator 107, and an adhesive disposed on the rear side 103 (not illustrated in FIG. 2). In FIG. 2, reference 107 points to the "N" (north) indicator of a compass-type DI design; however, as described in greater detail below, the at least one indicator can be, for example, a single light, or a collection of individual indicium, e.g., the "N," "S," "E," and "W" indicia corresponding to the primary compass cardinal directions as illustrated in FIG. 2. The body of the DI 100 includes, inter alia, an outer shell 105 which houses a circuit board supporting, inter alia, an electronic compass and related circuitry, a battery and an aperture 109 configured to allow ambient light to pass through to a photosensor disposed on the circuit board, as described in greater detail below.

In this embodiment, the outer shell 105 forms the outer surface of the body 101 of the DI 100. Preferably, the outer shell forms a water-proof or water-resistant outer surface, such that the other components of the body are protected from water, sweat, soot, and other environmental materials. The outer shell 105 can be of, e.g., a single-piece or multiple piece design. The material of the outer shell 105 can be chosen according to preference, including, without limitation, polymers, composites, and other materials. In a preferred embodiment, the outer shell has at least a two-piece design, such that the outer shell can be opened to access and change the battery of the DI 100 and replace or service any other components of the DI 100 if necessary.

Figure 3:
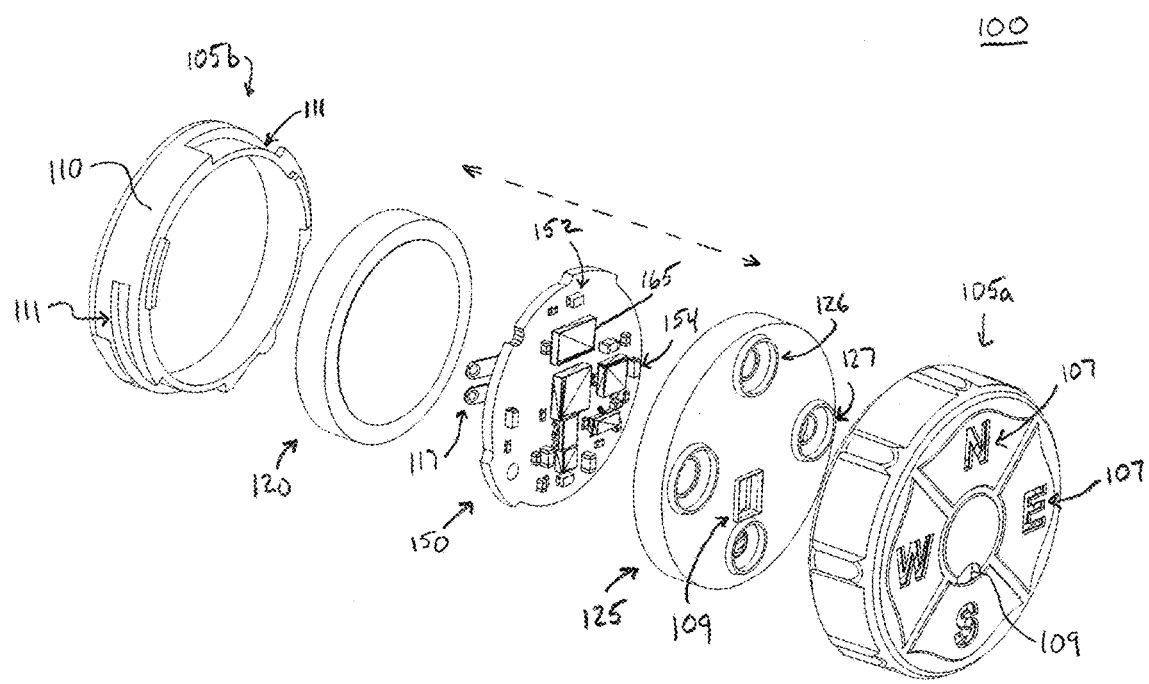
FIG. 3 is an exploded view of a directional indicator according to one embodiment.

Referring now to FIG. 3, the DI 100 is illustrated in an exploded view along the dashed double-headed arrow, according to one embodiment. In this embodiment, the outer shell 105 is formed of front 105a and rear 105b reversibly-interconnectable shell components. The front 105a and rear 105b components of the outer shell 105 are configured to house the inner elements of the DI 100, e.g., a battery, an electronic circuit board as described herein, and other elements to form a substantially waterproof and debris-proof housing. In this embodiment, the rear component 105b includes a shoulder member 110 having slots 111 therein which are configured to receive complimentary locking members on the inside of the front component 105a, such that the front (105a) and rear (105b) components can be reversibly lockingly engaged through a twisting action. In this arrangement, the front and rear components 105a, 105b form a twist-lock assembly wherein the front and rear components can be reversibly interlocked by engaging each of the halves and providing a quarter turn to one of the halves to provide the reversible lock. In this embodiment, the front and rear components 105a, 105b and the circuit board 150 are configured such that when the DI 100 is assembled in an operational configuration, e.g., as illustrated in FIG. 2, there is only one possible orientation of these components with respect to one another. In particular, the interlocking configuration provides that, e.g., the LED used in this embodiment, which is described below, is pre-programmed to correspond to a north indication lines up with the letter 'N' of the front component 105*a*, and similarly for the other LED cardinal direction indicators shown. While not illustrated in the figures, it will be understood that this functionality can be applied to other DI embodiments wherein additional directional indicators are used, e.g., NW, SW, etc., or where a compass direction is used.

In this embodiment, the DI 100 includes a circuit board 150 on which is disposed the electronic circuitry and components that enable the DI 100 to provide directional indication as described herein, and which is described in greater detail below.

In this embodiment, the DI 100 includes a battery 120 disposed between the circuit board 150 and the rear component 105*b* of the outer shell 105. In this embodiment, the circuit board 150 includes battery contact terminals 117 through which the circuit board 150 receives power. In this example, the battery 120 is a button-type battery, such as, without limitation, a lithium 3V CR2032 battery, although other suitable batteries can be used.

In this embodiment, the DI 100 includes a rubber gasket 125 disposed between the circuit board 150 and the front component 105*a* of the outer shell 105. The rubber gasket 125 serves to protect the circuitry and electronic components disposed on the circuit board 150 and, due to its slightly compressible nature, serves to keep the inner components of the DI 100, e.g., battery 120, circuit board 150, in contact between the front (105*a*) and rear (105*b*) components of the outer shell 105. It will be understood, however, that the rubber gasket 125 can be replaced by a gasket made of a different material such as plastic, if so desired. In this embodiment, the rubber gasket 125 includes several apertures such that light emitted from diodes of the circuit board 150 can pass through to the at least one directional indicator 107. For example, still referring to FIG. 3, apertures 126 and 127 are disposed such that light from diodes 152 and 154 can be independently transmitted to the "N" and "E" indicators 107 on front component 105*a*, respectively, when activated. In this embodiment, the rubber gasket 125 additionally includes a light sensor aperture 109 configured to allow ambient light to pass through to a photosensor disposed on the circuit board 150. In this embodiment, the gasket 125 material is opaque, which can help to prevent bleed-through to adjoining directional indicators when more than one is present. Furthermore, in this embodiment, the light sensor aperture 109 is configured to isolate only ambient light from outside the DI 100, so that light emitted from the circuit board does not influence the ambient light readings, as described in greater detail below.

Figure 4:
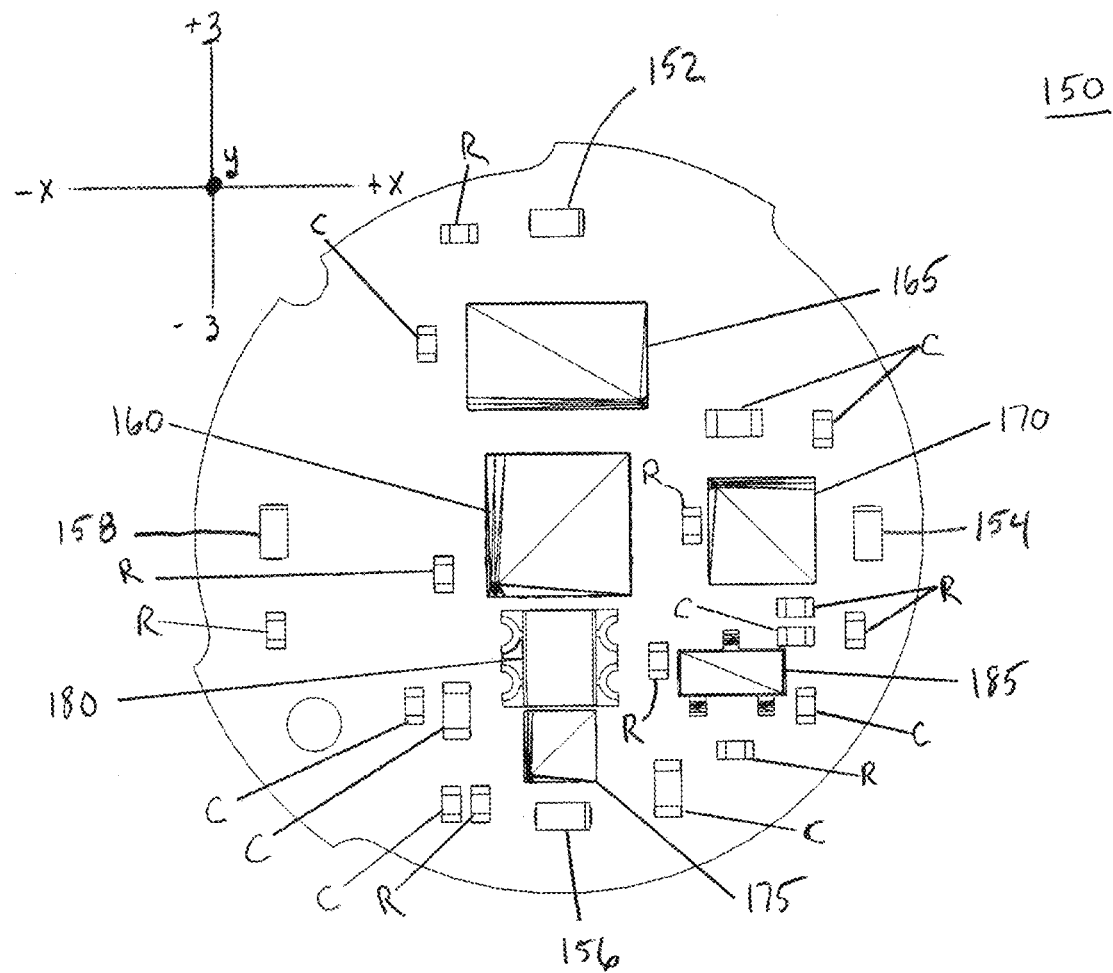
FIG. 4 illustrates various electronic components of a directional indicator according to one embodiment.

Referring now to FIG. 4, a magnified view of circuit board 150 is shown according to one embodiment. In this embodiment, circuit board 150 supports the electronic components that are cooperatively configured to provide the DI 100 directional indication functionality as described herein. It will be understood that the configuration of circuit board 150 as described herein is but one of many possible approaches, and that the configuration and components can be modified to achieve certain desired factors. Resistors R and capacitors C are labeled in FIG. 4 to show the configuration of those elements, according to one embodiment.

In this embodiment, circuit board 150 includes an electronic microcontroller 160 in electronic communication with first (152), second (154), third (156) and fourth (158) light-emitting diodes (LEDs), an accelerometer 165, an electronic compass 170, a photosensor 180, a voltage regulator 175 and a field-effect transistor (FET) 185.

In this embodiment, the microcontroller 160 is configured in part to store and execute logic commands for determining a direction in which the DI 100 is facing and activating the at least one directional indicator 107, among other functions. In this example, activating the at least one directional indicator 107 can include activating one of the first (152), second (154), third (156) or fourth (158) light-emitting diodes associated with the "N" "S" "E" or "W" indicium of the front component 105*a* of outer shell 105 according to a compass direction determined by the electronic compass 170. However, as described herein, other approaches can be used, e.g., activating the at least one directional indicator can include activating a single, visible LED when the DI 100 is facing north. Microcontroller 160 can be any suitable microcontroller known in the art. One exemplary, non-limiting microcontroller suitable for use is a PIC16F18345 microcontroller provided by Microchip Technology Inc., having headquarters in Chandler, Ariz., USA. This particular microcontroller is particularly favored due to its low power consumption which can be useful in prolonging battery life.

In this embodiment, the electronic compass 170 and related circuitry of the body of the DI 100 may be any electronic compass known in the art, but preferably is a small electronic compass in order to limit the size of the body and, therefore, the DI 100 as a whole. The electronic compass can be or integrate a magnetometer which, as those skilled in the art will recognize, is capable of measuring the direction and strength of Earth's magnetic field, such that the electronic compass 170 can determine the direction in which it is pointing or facing or being moved. In this embodiment, the electronic compass is in electronic signal communication with at least the microcontroller 160 which is configured to indicate the direction in which the DI 100 is being pointed or moved in substantially real time by, e.g., activating the appropriate LED light as discussed herein.

In this embodiment, electronic compass 170 is a 3-axis digital compass configured for low-field magnetic directional sensing. In this preferred embodiment, the magnetometer 170 is electronically gimballed so that the sensed direction is independent of tilt (e.g., from the z-axis) with respect to a horizontal plane generally defined by the Earth's surface (e.g., x-y axis). For example, it is common that firefighters move through structures in a variety of positions; a firefighter may walk upright into a building, and then transition to a crawling position upon encountering heat or smoke, for example. Thus, in this example, the orientation of the magnetometer 170 may transition from an orientation generally in the z-x plane as illustrated in FIG. 4 when the firefighter is standing, to one that is tilted forward, toward the y-axis as illustrated in FIG. 4 when the firefighter is crawling. In a preferred embodiment, the DI 100 should preferably provide accurate directional indication for a variety of orientations. One exemplary, non-limiting electronic compass 170 that can be used in a DI is the HMC5883L 3-Axis Digital Compass IC provided by Honeywell International, Inc., Morristown, N.J., USA.

In this and other embodiments, each light source that is configured to illuminate a directional indicator, e.g., one of the first (152), second (154), third (156) or fourth (158) directional indicators can be chosen or configured to emit a unique light color such that, for example, with reference to the DI 100 illustrated in FIG. 2, the "N" appears red, the "W" appears blue, the "S" appears white and the "E" appears green when illuminated. In an alternative approach, each LED, e.g., LED 152, 154, 156 and 158 can be of the type that emits substantially white light, and a colored filter can be disposed between the LED and the at least one directional indicator to provide a colored effect of the at least one directional indicator. It will be understood that any color scheme can be used as desired. One exemplary, non-limiting LED is part no. LTST-C191KRKT provided by Lite-On, Inc., having a main office in Milpitas, Calif., USA.

As firefighters and other rescue personnel in particular depend on their gear to function when needed, it can be advantageous to maximize battery life of the DI 100. In this and other embodiments, the accelerometer 165 can be used in cooperation with the microcontroller 160 for controlling an operational aspect of the DI 100. For example, based on motion sensed by the accelerometer 165 within a predefined time period, the microcontroller 165 can cause the DI 100 to operate in a low-power, "standby" mode which can be a mode that consumes a negligible amount of battery power; a reduced-power "slow" mode, which, for example, can be a mode where the brightness of the at least one directional indicator is reduced, a refresh rate for querying the electronic compass for a directionality is reduced, or a combination thereof; and a full-power, active or "awake" mode where full power is provided to each of the electronic components of the DI 100 to provide directional indicator brightness, electronic compass query frequencies, and other operational aspects of the DI 100 as described herein when being actively used, e.g., during active firefighting activities.

For example, the microcontroller 160 can include logic instructions to measure an accelerometer reading at predetermined intervals, e.g., every 30 seconds. If the accelerometer senses movement, then the DI 100 can remain in the awake mode and provide directional indication as described herein. However, if the accelerometer does not sense movement within a longer, pre-determined time interval, e.g., 45 minutes, 1 hour, 2 hours, etc., then the microcontroller 160 can initiate logic instructions causing the DI 100 to switch to the standby mode to conserve battery power. In this embodiment, even if the DI 100 is in the standby mode, the accelerometer continues to receive power so that motion of the DI 100 will cause the accelerometer to send a 'wake-up' signal to microcontroller 160 and re-enter the active operational state. Between the active mode and the standby mode, the slow mode can be a mode where the DI 100 still presents directional information to the user, but the light intensity of the at least one directional indicator can be reduced, the query rate of the electronic compass can be reduced, and other electronic components of the DI 100 can function in a reduced power state to conserve battery power. In one example, the DI 100 can enter the slow mode from the active mode when movement has not been sensed by the accelerometer after, e.g., 5 minutes, 10 minutes, or any other desired time period. The flowchart described with respect to FIG. 5 further illustrates this logic according to one embodiment.

In one embodiment, the microcontroller 160 can include additional power-saving functionality by functioning in the aforementioned 'slow' mode, which can be an operational mode in which the DI 100 is active, but the intensity or brightness of the at least one directional indicator 107 is reduced and, optionally, the refresh rate of the orientation determination can be increased, both of which can extend battery life. For example, the microcontroller 160 can be programmed to correlate accelerometer signals with certain types of typical movements or behaviors of the wearer.

In the case of usage by a firefighter, one exemplary activity or behavior can be crawling on the ground in search of a fire in a building. Such activity can produce certain types of accelerometer readings, e.g., constant motion, the head of the user (and thereby the electronic compass of the DI 100) being tilted on average at a certain angle, e.g., 45-60 degrees with respect to the ground (horizontal plane) for a period of time, etc. Receiving such accelerometer signals, the microcontroller 160 can cause the DI 100 to perform in the awake mode, providing maximum brightness of the at least one directional indicator, directional refresh rate, and other functions. However, if the microcontroller 160 receives accelerometer signals indicative of non-active firefighting behavior, e.g., reduced or no motion, then the microcontroller can cause the DI 100 to transition to the 'slow' mode which still provides directional indication but does so using reduced power, as described above.

In one embodiment, a DI 100 can include an integrated thermometer (not illustrated in FIG. 4) in electronic communication with the microcontroller 160 and configured to measure the ambient temperature around the DI 100. In this embodiment, the microcontroller 160 can be programmed such that the DI 100 operates in active mode when the measured temperature is above a certain preselected threshold and, optionally, transitions the DI 100 to the slow or standby mode when the measured temperature is below the preselected threshold. In one example, the preselected threshold can be a temperature indicative of working in or near a fire environment, e.g., 110° F., 120° F., 130° F., 140° F., 150° F., or greater or lesser depending on preference. In such an embodiment, the thermometer can be an electronic thermometer entirely disposed on the circuit board 160 or, optionally, the thermometer can include a thermocouple configured to extend to a selected portion of the face mask or, optionally, extend outside of the face mask by a method that preferably does not defeat the positive pressure functionality of an SCBA face mask in particular.

In this embodiment, FET 185 is a metal-oxide semiconductor FET configured to provide power management in particularly with respect to accelerometer 165. In general, the FET 185 can be configured to provide a power source to the accelerometer 165 when the DI 100 is in the standby mode for the purpose of monitoring for movement. As described herein, the electronic circuitry and microcontroller logic of the DI 100 can be configured such that movement of the accelerometer during the standby or slow mode can trigger the DI 100 to switch to an 'active' mode as described herein. While many MOSFETs are commercially available, one exemplary FET 185 is part number ZXM61P02F manufactured by Diodes Incorporated, having a corporate headquarters in Plano, Tex., USA.

In this embodiment, photosensor 180 is configured to measure ambient light in the vicinity of the DI 100 so that the brightness output of the at least one directional indicator can be adjusted accordingly. For example, in this embodiment, microcontroller 160 can be configured to increase or decrease the light output intensity or brightness of the first (152), second (154), third (156) and fourth (158) LEDs if an output voltage of the photosensor 180 is above or below a predetermined photosensor threshold output value, respectively. One non-limiting, exemplary photosensor suitable for use as described herein is a silicon PIN photodiode, part no. PD15-22B/TR8 manufactured by Everlight Electronics Co., LTD, Taiwan.

In this embodiment, the voltage regulator 175 is configured to maintain a constant voltage level for the electronic components of the DI 100 and is particularly configured to maintain the lowest voltage level necessary for proper electronic functionality while maximizing battery life. One exemplary, non-limiting voltage regulator suitable for use as described herein is the Semtech TS14001 nanoSmart® ultra-low-power linear regulator provided by Semtech Corporation, having corporate headquarters in Camarillo, Calif., USA.

In general, in this embodiment, microcontroller 160 is configured to receive a measured directionality from the electronic compass 170, e.g., north, south, east or west and correspondingly activate one of the first (152), second (154), third (156) or fourth (158) LEDs that has been configured to correspond to that directionality. In this embodiment, for example, the first LED 152 corresponds to the north direction, the second LED 154 corresponds to the east direction, the third LED 156 corresponds to the south direction and the fourth LED 158 corresponds to the west direction as these are the primary cardinal directions used in this DI example. The microcontroller 160 can be programmed such that the LEDs are activated according to a refresh rate where the measured magnetometer direction is processed according to any desired frequency, e.g., every 65 ms, every 200 ms, 10 readings per second, 5 readings per second, once every second, twice every second, once every five seconds, etc. The desired frequency can be dependent on the state of the DI 100, e.g., in the active, slow or standby modes as described herein. While the embodiment of DI 100 shows four cardinal directions, it will be understood that a DI can be configured to show as many compass directions as desired, e.g., to include NE, SE, NW, SW, etc. or, in another embodiment, to show compass direction as a digitally-displayed heading value, e.g., 0°, 020°, 180°, 280°, etc. Other modifications and alternative embodiments will be apparent to those skilled in the art.

In this embodiment, the battery of the DI 100 is configured to provide power to all electronic components requiring power. The battery may be of any design or type known in the art, but preferably is a small battery in order to limit the size of the body and, therefore, the DI 100 as a whole. Furthermore, the battery is preferably one which has a long battery life to limit the number of battery changes necessary and to increase the available operational time span of the DI 100.

For example, and without limitation, the battery may be of a watch-type lithium, silver oxide, zinc air, or similar type of button or coin battery. Preferably, the outer shell of the body of the DI 100 may be configured in such a way (such as a two-piece design) that the battery may be easily replaced. In one embodiment, the battery may be rechargeable, in which case the outer shell of the body of the DI 100 can include a suitable receptacle for receiving a power cord such as a USB-mini plug. Optionally, in another embodiment, the battery can be of the type that is rechargeable by non-corded methods, e.g., through the use of magnetic fields, ultrasound, light, or other methods.

In one embodiment, the DI 100 can include an exteriorly-accessible power button configured to turn the DI 100 on or off in order to save battery life when the DI 100 is not being used, for example when the firefighter or other user is not on call or is between calls. However, more preferably, the body can include circuitry configured to automatically turn the DI 100 on when it is in use, such as when motion has been detected, and off when it is not in use, for example, when no motion has been detected for a pre-determined period of time, such that the aforementioned power button is not required.

For example, in one embodiment, the body of the DI 100 can include a pressure gauge cooperatively configured with the electronic circuitry of the DI 100, such that when the firefighter turns his or her SCBA air on and places the face mask of the SCBA on their face, thereby causing the pressure inside the mask to be greater than the normal atmospheric pressure, the DI 100 automatically turns on when the higher pressure is sensed and then automatically turns off when it senses normal atmospheric pressure for a predetermined period of time (typically, 15 to 30 minutes).

In one embodiment, the DI 100 can be programmed, e.g., through the use of software logic to preserve battery life in various ways. For example, the DI 100 can include an accelerometer and can be programmed to transition to the slow or standby mode while monitoring the accelerometer for a motion signal. If the accelerometer generates a motion signal, the DI 100 can automatically turn on and remain on in the awake mode for a pre-determined amount of time, e.g., 30 minutes, 1 hour, 2 hours, etc. The DI 100 can be further programmed to turn off or return to slow or standby mode after a period of inactivity (e.g., 15 minutes, 30 minutes, 1 hour, 2 hours, etc.). If the DI 100 includes a pressure sensor or accelerometer, such components may be included as part of the electronics of the body of the DI 100 together with the electronic compass.

While it is preferable that the body of the DI 100 be small and be configured in such a way as to be able to be used with the face masks of existing SCBAs, alternatively the body can be configured such that it is incorporated into the face mask itself or an existing replacement part for the face mask in order to be permanently integrated into the face mask. In such an event, the body can be configured to have the shape of, and incorporate any other aspects of, such a replacement part or portion of the face mask.

In this embodiment, the at least one indicator of the DI 100 is secured to, and is preferably integral to, the body of the DI 100. In this embodiment, the at least one indicator is preferably a light-emitting diode (LED) which, due to the low power consumption of LED's in general can make the DI 100 more efficient and allow the battery to last longer; it should be understood, however, that the indicator may take the form of any light source known in the art. In another example, the indicator can be a digital display, e.g., a liquid crystals display (LCD) or a back-lit digital display (including LCD displays) similar to those found on some digital wristwatches.

In this and other embodiments, the at least one indicator may take a variety of forms based upon the needs of the firefighter or other user. For example, (1) if the firefighter desires only to be able to determine which direction is north (or a different pre-selected direction), then the at least one indicator can be only a single light that turns on when the DI 100 is facing or moving in substantially a northern direction; (2) if the firefighter desires to have greater detail and know in which of the cardinal directions (north, south, east, or west, or any direction therebetween) the firefighter is facing or moving, then the at least one indicator can, for example, provide multiple indicia, e.g., four different directional indicium as shown in the embodiment of FIG. 2, each indicating a different cardinal direction (either with different colors, with N, S, E or W letters, a combination thereof, or other approaches); or (3) if the firefighter desires even greater detail about the direction in which the firefighter is facing or moving, then the at least one indicator can, for example, include a lighted alphanumeric display that can display the direction in which the firefighter is facing or moving in the form of a numerical bearing or a more detailed cardinal or ordinal direction (or further divisions) such as N, NE, NW, etc.

In one embodiment, the DI 100 can be configured to measure an amount of ambient light, e.g., through an integral light sensor and adjust the output brightness of the at least one indicator in order to maximize the ability of the firefighter to visualize the at least one indicator or, in those embodiments including indicator indicia, those indicia. For example, when the DI 100 is located in a bright environment, such as outside in bright sunlight, the brightness of the at least one indicator can be increased to allow the firefighter to better see the indicated display, while when the DI 100 is in a darker environment, such as in a room filled with smoke, the brightness of the at least one indicator can be reduced to avoid distracting the firefighter or diminishing the firefighter's vision in the surrounding environment.

In one embodiment, the color projected from the indicator can depend upon ambient light levels as measured by the light sensor to provide for visual acuity under a first ambient light circumstance, and to provide both visual acuity and preserve night vision in a second, different ambient light circumstance. For example, in daylight conditions, the light sensor may measure a relatively high level of ambient light; accordingly, the output color of the indicator can be white, whereas in low- or zero visibility conditions where a measured amount of ambient light may be relatively low, the light output color of the indicator can be red or green so as to preserve the user's night vision. If such a light sensor is included, it can be included as part of the electronics of the body of the DI 100 that includes the electronic compass. In such embodiments, multi-color LED's or a plurality of different colored LED's for the directional indicator (or plurality of directional indicator indicium) can be utilized to provide the different output colors as described.

In this embodiment, the DI 100 includes an adhesive that allows it to be secured to the face shield portion of the firefighter's (or other user's) face mask. The adhesive can be any adhesive known in the art. Optionally, the adhesive can be an adhesive that allows the DI 100 to be removably secured to the face mask of the SCBA to allow the battery in the DI 100 to be changed or to replace the DI 100 with a new one if the DI 100 is damaged or no longer functions.

In one approach, the DI 100 can be secured to the firefighter's SCBA face mask near the forehead area, e.g., as illustrated in FIG. 1, such that it is out of the firefighter's line of sight but still may be seen by the firefighter. Therefore, typically, the DI 100 can be secured to the face mask in the forehead area above and between the firefighter's eyes and above the firefighter's nose. Alternatively, the DI 100 may be secured to the firefighter's SCBA face mask in a different location on the face mask that is out of the firefighter's line of sight but is still visible to the firefighter or is in the firefighter's peripheral vision. The specific type of indicator used with the DI 100 may influence the selection of the location for the DI 100 on the SCBA face mask as well—if indicator lights with cardinal or ordinal directions or bearing numbers are used then it may be preferable to locate the DI 100 closer to the firefighter's line of sight so that the indicium, e.g., letters or numbers may be easily read. However, one advantage of the DI 100 shown in FIG. 2, for example, is that the directional indicium—N, S, E and W, are spatially separated, which can allow a user to determine a directionality at minimum by the position of the light emitted from the directional indicator, e.g., "up" corresponds to north, and "down" corresponds to south—in such a configuration a user need not necessarily 'read' the individual letters to gain their compass orientation.

Many SCBA face masks, and protective face masks in general include a face shield that is oriented at an angle to the user's face. Thus, in one embodiment, a wedge member can be inserted between the face shield and the rear side 103 of the DI 100 that causes the front side 102 of the DI 100 to be substantially perpendicular to the user's line of sight when viewing the DI 100. In an alternative embodiment, the rear side 103 of the DI 100 can be wedge shaped as appropriate for the type of face mask used to provide a similar type of line-of-sight correction.

Figure 5:
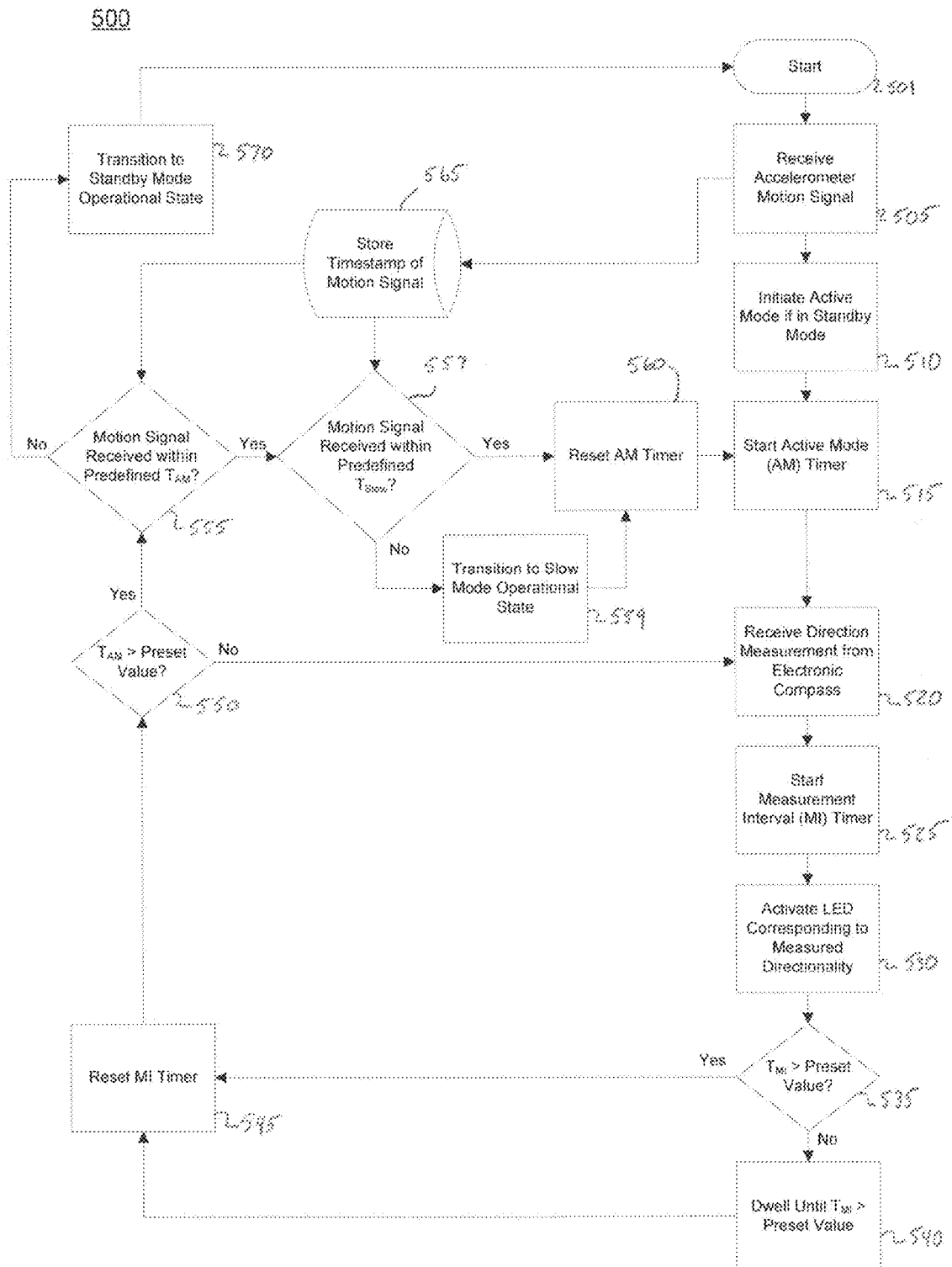
FIG. 5 is a flowchart illustrating an operational logic sequence of a directional indicator according to one embodiment.

Referring now to FIG. 5, a flowchart 500 illustrating some operational characteristics of the DI 100 is shown according to one embodiment. It will be understood that the flowchart 500 illustrates one of many possible logic sequences for enabling the functionality of the DI 100 as described herein, and therefore is not limited to the specific steps shown.

In this embodiment, the flowchart 500 begins at the start bubble 501, which, for the sake of this illustration, can represent the DI 100 in the low-power, standby mode as described herein, as if the DI 100 has been at rest in a firefighter's locker for an extended period of time. As described herein, the accelerometer 165 of the DI 100 can remain active in the standby mode, being ready to sense movement and activate a wake-up signal accordingly.

In this example, at step 505 the microcontroller 160 receives an accelerometer 165 motion signal, which could occur, for example, when the firefighter picks up his or her SCBA face mask to go on a call. A timestamp of the motion signal can be stored in a data repository, e.g., cache memory, at step 565 for purposes of determining when to revert to standby mode later in the sequence as described below. Next, at step 510, if the DI 100 was previously in standby mode, the microcontroller can transition to 'active' mode, which, as described herein, can be a full-power mode where the DI functions to provide direction indication as described.

In this and other embodiments, the accelerometer 165 or the microprocessor 160 can be programmed to transition from standby to active mode only when a preselected sequence of motion signals is sensed or received, respectively, so as to discriminate against motion of the DI 100 that is not intended to activate the device. For example, SCBA face masks are commonly carried on fire apparatus, and the motion of driving those apparatuses could cause the accelerometer to send a motion signal to the microcontroller. This could cause the DI 100 to activate unnecessarily, which could cause rapid battery drain. To discriminate against such 'false' signals, the DI 100 can be caused to enter active mode after receiving, for example, two sharp taps to the SCBA face shield within a predefined time period, e.g., 1 or 1.5 seconds. Similarly, the accelerometer 165 or the microprocessor can be programmed to only exit standby or slow mode, or both if a sharp motion, such as a tap, or a sequence of taps exceeds a pre-determined motion signal threshold level, which can be discriminated against lower-level background motion signals caused, e.g., from being in a driven apparatus.

In one embodiment, the microcontroller 160 can be programmed with an algorithm to discern a background level of motion, e.g., background noise, and remain in the standby mode until a motion event is sensed by the accelerometer 165 which is above the background level of motion, e.g., a tap or double-tap as described herein. In another approach, the microcontroller 160 can be programmed to detect a certain movement as evidenced by an accelerometer signal to cause the DI 100 to enter a particular state, e.g., an active state, such as the movement associated with the DI 100 being picked up, which can be compared against a measured average background level of motion, such as average motion associated with travel in an apparatus. In this and other embodiments, the circuit board can include other components necessary to enable the DI 100 to differentiate between accelerometer events that should cause activation or 'wake-up' of the DI 100 versus average 'background' motion sensed by the accelerometer 165, such as a memory module, e.g., RAM, ROM, cache or other types of memory, a repository of logic instructions, which may be stored, e.g., in RAM or ROM memory, and associated input and output registers necessary to effect electronic communication between the components.

Next, at step 515, after the DI 100 has entered active mode, an active mode (AM) timer is started. The AM timer can be a timer that measures a preselected duration of time that the DI 100 should remain in active mode, e.g., 30 minutes, 45 minutes, 1 hour, etc. Next, at step 520, the microcontroller 160 receives a direction measurement from the electronic compass 170. In this and other embodiments, the electronic compass 170 can be programmed to continually provide a directionality signal, e.g., a signal that indicates the direction that the electronic compass 170 and thereby the DI 100 is facing, or, alternatively, the microcontroller 160 can query the electronic compass 170 for a directionality reading.

Next, at step 525, a measurement interval (MI) timer is started. The MI timer can be a timer that determines the 'refresh' frequency of the at least one directional indicator 107, the electronic compass 170, or both, such that the microcontroller 160 causes activation of, e.g., the appropriate one of the first (152), second (154), third (156) or fourth (158) LEDs corresponding to the measured directionality at predetermined intervals, step 530. In this and other embodiments, the computation of directionality can be computed by the microprocessor 160 by receiving x, y and z coordinate values provided by the electronic compass 170. In one approach, the coordinate values are mapped to a spherical coordinate system, from which the spherical coordinates $\rho$, $\theta$ and $\varphi$ can be determined by conventional mathematics. From these value, $\theta$ can represent the compass direction and $\rho$ can represent the tilt angle of the electronic compass 170.

Next, at decision point 535, a determination is made as to whether the elapsed measurement interval time ($T_{MI}$) is greater than the preselected (programmed) value. If not, the process continues to step 540, where the microcontroller dwells until $T_{MI}$ is equal to or greater than the preselected value. Next, at step 545, or if the determination of decision point 535 is affirmative, i.e., $T_{MI}$ is equal to, or greater than the preselected value, then the MI timer is reset.

Next, at decision point 550, a determination is made as to whether the elapsed AM time ($T_{AM}$) is greater than or equal to the preselected (programmed) value. If so, e.g., if time still remains for the DI 100 to be in the active mode, then the process continues back to step 520 where the sub-sequence continues to loop until $T_{AM}$ is greater than, or equal to the preselected value. At that point, the process continues to decision point 555, where a determination is made as to whether a motion signal has been received during the preselected AM time period. In this embodiment, the microcontroller 160 can access, for example, a timestamp of the last accelerometer motion signal; or determine the amount of time that has elapsed since the last accelerometer motion signal. This sub-sequence is useful to ensure that the DI 100 does not switch to standby mode when it is actively being used. If $T_{AM}$ has elapsed and no accelerometer motion signals have been detected or stored within the preselected AM time period, then the process proceeds to step 570, where the microcontroller initiates standby mode of the DI 100. The process then returns to step 501, where the DI 100 monitors for an activation signal from the accelerometer again, as discussed above.

Reverting to step 555, if a motion signal is received within the preselected AM time period, then the process continues to step 557, where a determination is made as to whether or not the DI 100 should continue in the active mode state, or the reduced-power slow mode state. In this embodiment, Tsiow represents the preselected time period for which if the accelerometer registers no motion, or the microcontroller determines that the motion is correlated with reduced user activity, then the DI 100 transitions to the slow mode as described herein, step 559. Oppositely, if the accelerometer registers motion or the microcontroller determines that the motion is correlated with active user activity, e.g., active firefighting behaviors and activities, then the DI 100 continues to function in awake mode and the AM timer is reset, step 560. The process then continues to step 515, previously described, and the sub-loop can continue until the state at decision point 555 is negative.

Figure 7:
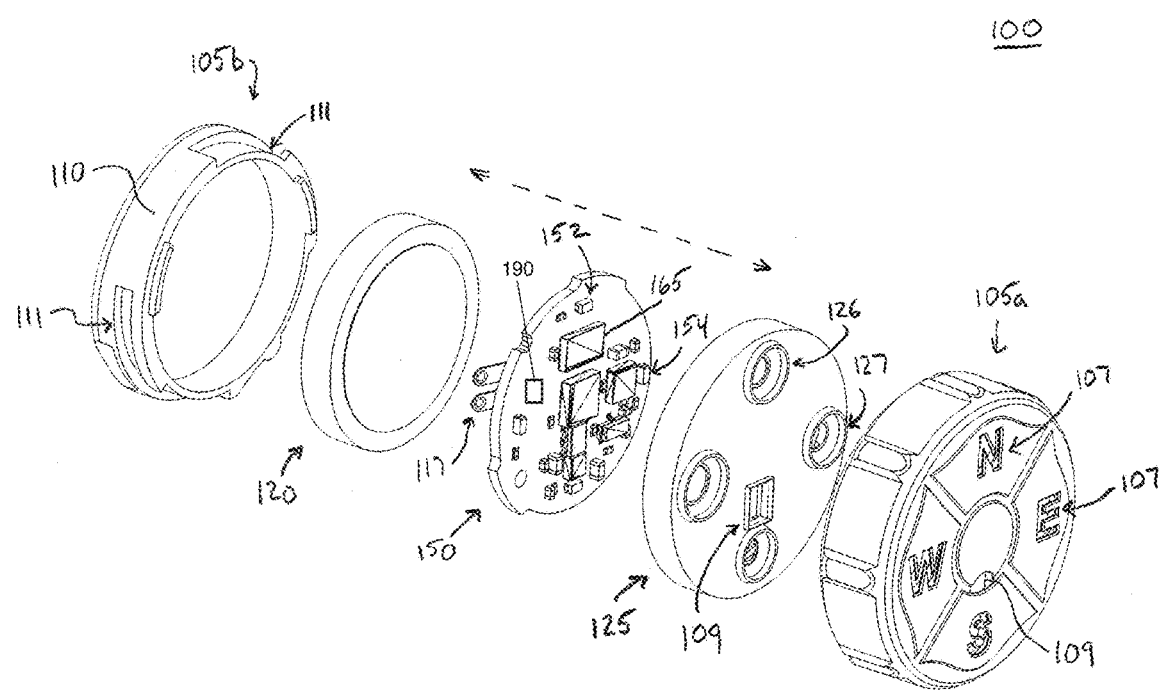
FIG. 7 illustrates an alternative embodiment of the directional indicator shown in FIG. 3.
Figure 8:
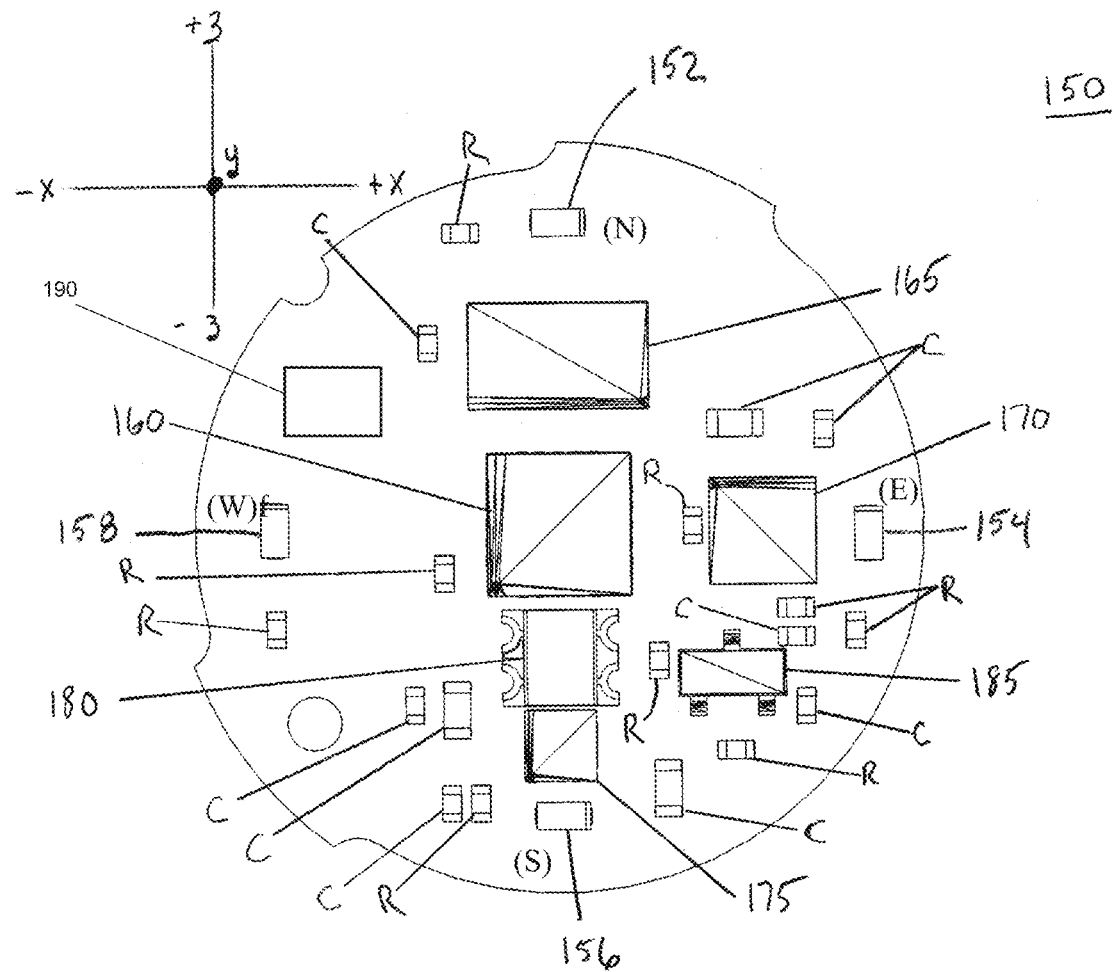
FIG. 8 illustrates an alternative embodiment of the electronic components of the directional indicator shown in FIG. 4.

Referring now to FIGS. 7 and 8, in one exemplary aspect, a directional indicator can include a shock sensor 190. The shock sensor 190 can be used in cooperation with other electronic components of the DI to provide power saving features. In the example of FIGS. 7 and 8, the shock sensor can provide a "wake-up" signal to at least the accelerometer, and alternatively other electronic components of the DI, to cause the DI to transition from a powered-down, standby or sleep mode to a fully-powered or active mode. For example, the DI can be configured to power-down after a set amount of time idle has elapsed, e.g., 1 hour, after not receiving motion signals from the accelerometer. After the 1-hour period, the DI can power down battery power consuming components, such as the microcontroller 160, the accelerometer 165, and other components. In some configurations, the microcontroller 160 can control the shut-down or power-off sequence. In some configurations, the electronic components can be turned completely off, as opposed to a semi-powered, 'standby' or 'sleep' state, in the powered-down mode.

In this embodiment, the shock switch 190 can be activated when the DI receives a percussive shock, for example, and without limitation, the type of percussive shock produced when a user taps their finger onto the DI, or onto a surface to which the DI is attached. In one embodiment, the sensitivity of the shock sensor can be configured so as to require a percussive shock above a certain shock threshold level in order to activate the shock sensor 190.

For example, the shock sensor 190 can be tuned such that a light tap, e.g., one provided by a person tapping the pad of their fingertip onto the DI will trigger the shock sensor 190. Alternatively, the shock sensor 190 can be programmed such that a sharp 'rap' by the tip of a finger is required to trigger the shock sensor 190. In any case, the shock sensor can be configured to require predetermined sequence of percussive shocks in order to trigger it, such as, for example, two sharp taps within 2 seconds.

One non-limiting example of a shock sensor 190 is the SQ-ASE shock and accelerations sensor, e.g., part no. SQ-ASE-060-ICT provided by Signal Quest, LLC, of Lebanon, N.H., USA. Other, alternative sensors that may be suitable by the same provider are sold under model numbers SQ-ASA, SQ-ASB, SQ-ASC and SQ-ASD.

In one embodiment, if the DI is in a powered-off, standby or sleep mode and the shock sensor 190 receives a percussive shock sufficient to trigger it, the shock sensor 190 can send a 'wake-up' signal to one or more of the accelerometer, the microcontroller or other electronic components of the DI. In one approach, the shock sensor can include an internal switch that is in the always-open configuration; delivering a percussive shock to the shock sensor can close the switch, allowing current to flow from the switch to other signal-connected electronic components. Thus, in one embodiment, a wake-up signal can be an electrical current or voltage signal or burst that occurs as a result of the internal shock sensor switch closing, allowing the signal or burst to reach at least one of the accelerometer and microcontroller. It should be understood that the shock sensor 190 can be in signal communication with other electronic components of the DI as well.

In one embodiment, the accelerometer 165 of the DI can be configured to remain on, in the fully-powered state, for a period of time after receiving a wake-up signal from the shock sensor 190, in order to monitor for specific movements that can be further associated with a 'wake-up' command. This can aid in preventing false wake-up signals from the shock sensor, e.g., when traveling on a bumpy road, or if the DI is stored within a gear case that is thrown onto the ground, into a locker, etc. In one non-limiting example, after receiving a percussive shock sufficient to trip the shock sensor, the accelerometer can be activated for a period of time, e.g., 2 seconds, to monitor for a confirmation motion. The confirmation motion can be a specific motion that the DI must undergo in order to toggle to the fully-activated, or awake state, where the DI is fully functional. In various embodiments, the accelerometer itself can be programmed or configured to recognize the confirmation motion; or, in another approach, the shock sensor can temporarily also energize the microcontroller which can be programmed to recognize the confirmation motion. If the confirmation motion is confirmed, then the DI can toggle from the powered-off, standby or sleep mode into the fully-functional or awake mode.

In one such example, the DI can be configured to monitor for a distinct confirmation movement from the accelerometer 165 after it has been activated by the shock sensor 190. For example, and without limitation, the distinct confirmation movement could be a nodding motion. Thus, in this example, a firefighter could activate the DI from the powered-off, standby or sleep state to the fully-powered or awake state by rapping his finger twice on an SCBA face shield to which the DI is attached—thereby activating the shock sensor—and nodding his head forward and backward—thereby confirming the distinct confirmation motion. The microcontroller can be programmed to recognize this sequence of events as a wake-up command that toggles the DI into the fully-powered, or awake state, providing all of the exemplary directional indication functionality as described herein. If, however, the pre-determined, confirmatory 'wake-up' sequence is not recognized within the allotted time, then the DI can revert to a powered-off, standby or sleep state.

Figure 10:
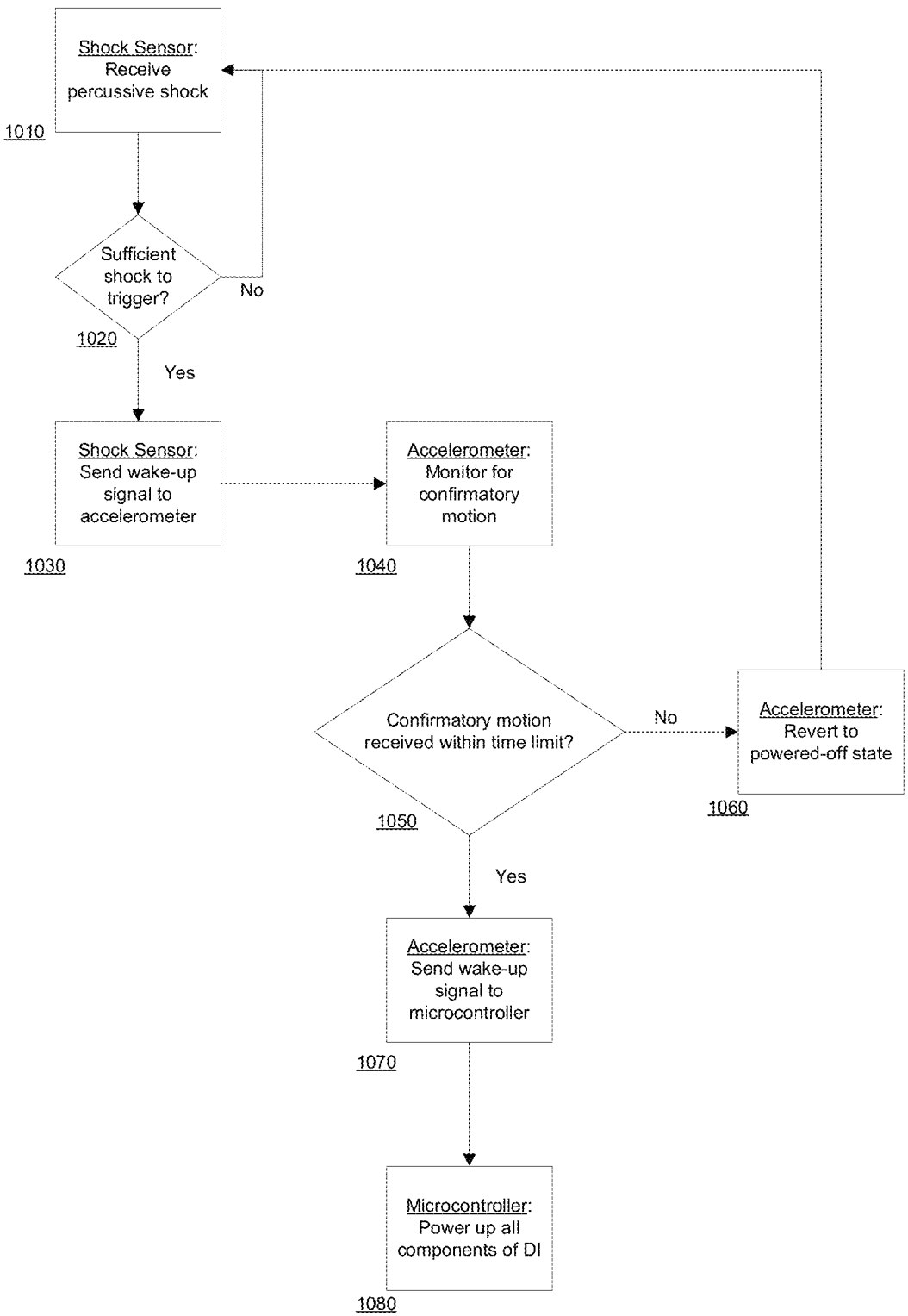
FIG. 10 is a flowchart illustrating an operational logic sequence of a directional indicator according to one embodiment.

One exemplary embodiment is illustrated in FIG. 10. In this process, the DI is assumed to be in a powered-off or sleep state prior to step 1010. At step 1010, the shock sensor receives a percussive shock. If the percussive shock is sufficient to trigger the shock sensor (step 1020), the shock sensor sends a wake-up signal to the accelerometer, step 1030; if the percussive shock is not sufficient to trigger the shock sensor, the process reverts to step 1010.

After the shock sensor sends a signal to the accelerometer (step 1030), the accelerometer monitors for a pre-determined confirmatory motion, step 1040. If the confirmatory motion is received and recognized within a predetermined time period (step 1050), then the accelerometer sends a wake-up signal to the microcontroller, step 1070. If the confirmatory motion is not recognized or received within the predetermined time period, then the accelerometer reverts to the powered-off state (step 1060) and the process reverts to step 1010.

When the accelerometer sends the wake-up signal to the microcontroller, the microcontroller causes all components of the DI that were in the powered-off or sleep state to become fully powered and activated, step 1080.

Thus, in one embodiment, a directional indicator 100 can include a microcontroller 160 in signal communication with at least an electronic compass 170 and an accelerometer 165. The directional indicator 100 can further include a plurality of individually-actuatable light sources 152, 154, 156, 158 arranged such that the position of each light source represents a unique compass direction (N, S, E, W, as illustrated, e.g., in FIG. 8), wherein each of the light sources is actuatable by the microcontroller to controllably emit light. The directional indicator 100 can further include at least one power source, e.g., battery 120 providing power to at least the microcontroller, and a shock sensor 190 in signal communication with the accelerometer. In this example, each of the foregoing electronic components can be operatively assembled on a circuit board 150.

Figure 9:
FIG. 9 illustrates a digital display according to one embodiment.

Referring to FIG. 9, in one embodiment, a DI can include a digital display 192 in signal communication with microcontroller 160 that is configured to display a determined heading of the DI. The digital display 192 shown in FIG. 9 is one of many possible display options and is non-limiting. In this embodiment, the digital display 192 can display a determined heading of the DI, such as, and without limitation, "N," "S," "E" or "W" indicium corresponding to the cardinal compass headings. The digital display 192 can show non-cardinal headings such as "NE", as in FIG. 9, or a heading value such as "60°" as desired.

Thus, in one embodiment, a DI can include a microcontroller 160 in signal communication with at least a digital display 192, an electronic compass 170 and an accelerometer 165. The digital display 192 can be operable to show indicia corresponding to a heading direction of the directional indicator determined by the electronic compass 170. The DI can further include at least one power source 120 providing power to at least the microcontroller 160, and a shock sensor 190 in signal communication with the accelerometer 165.

Figure 6:
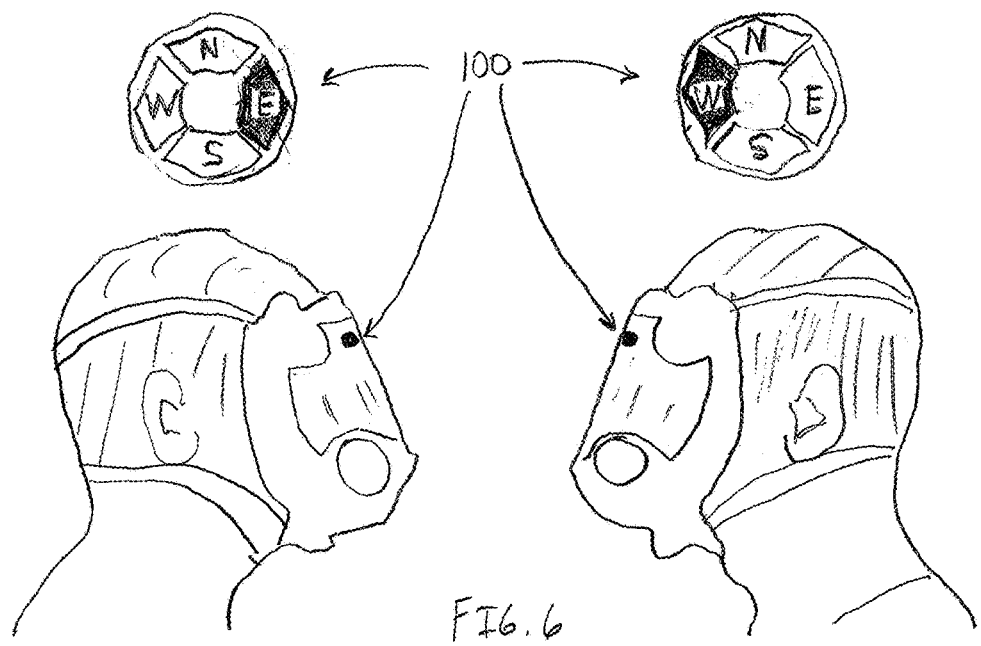
FIG. 6 illustrates a directional indicator indicating a facing direction of a user in two opposite orientations, according to one embodiment.

Referring now to FIG. 6, one purpose of the DI 100 is to allow a firefighter or other user to quickly and efficiently determine his or her direction, and/or direction of travel when in an unfamiliar or low visibility environment. For example, in one embodiment, the indicator will illuminate when the firefighter or other user is facing in, or moving in, a particular direction (just north, or another single selected direction, if only a single indicator is used; north, south, east, or west or specific bearings if multiple indicators are used or an alphanumeric display is used for the indicator). In the example shown in FIG. 6, the firefighter on the left side is facing east, causing the "E" directional indicators of the DI 100 to illuminate; the firefighter on the right side is facing west, causing the "W" directional indicator of the DI 100 to illuminate. By allowing the firefighter or other user to know the direction of true north, east, west or south, for example, the firefighter can then use his or her knowledge of the building layout, their entry location, or outside radio communications to determine the direction of the closest exit or the location at which the firefighter is needed.

Furthermore, one advantage of the DI 100 is that directional information is constantly being supplied to the user. In the case of firefighting, this can provide the ability to constantly monitor the firefighter's movements so that he or she can develop a mental map of their progress through a low- or zero-visibility environment. For example, if a firefighter has become disoriented within a structure, reference to a compass direction may supply at least some level of orientation. However, if that firefighter has monitored his direction using the DI 100 as he progresses through the structure, he can realize, for example, that he has made an "L" shaped path to his current location, first traveling west, then north, for example. If the firefighter needs to quickly return along his ingress route, he will know that he needs to travel south and then east to escape.

As such, the DI 100 not only aids a firefighter or other user in finding his or her exit from the building, but it can also assist in internal fire control operations. A firefighter inside a burning building often has low or no visibility, while outside, command staff personnel often see indicators—visible flames or smoke coming from an exterior wall, for example—that allow them to better locate the source or current location of the fire. Incident commanders commonly use alphabetic identifiers to provide a reference system for building layout. For example, the 'front' or street-address side of the building can be called "Side A" and the adjoining walls are referenced as "Side B," "Side C," etc. However, this nomenclature only works if the firefighter inside the building is oriented to the building or a compass direction. If the firefighter cannot determine which way he or she entered the building from, which is a common occurrence when the firefighter is in an unfamiliar environment, possibly with many twists and turns, or visibility is poor, then the incident commander can no longer effectively direct the internal fire control operations to the locations in which they are needed. Likewise, if the building must be evacuated and the firefighter cannot determine which way he or she entered the building from, that disorientation may result in the firefighter's injury or, potentially, death.

If a firefighter or other user has become disoriented, the DI 100 can provide the direction of true north, for example, and allow the firefighter to re-orient themselves and, if the incident commander determines that the firefighter has become disoriented the incident commander can direct the firefighter to the proper location using the compass direction relative to true north direction provided by the DI 100.

It will be recognized by one skilled in the art that the size, configuration, or dimensions of the DI 100 can be adjusted to fit various sizes of face masks of SCBAs. Likewise, it will be recognized by one skilled in the art that the materials from which the DI 100 is made may be varied without departing from the spirit and scope of the instant disclosure.

Additionally, while the use of a DI 100 with a self-contained breathing apparatus used by firefighters and similar personnel is discussed herein, it will be recognized by one skilled in the art that a DI 100 can be used with any general type of self-contained breathing apparatus or protective face mask. For example, the present invention may also be used as part of the goggles or face mask used with a self-contained underwater breathing apparatus, a hazardous materials self-contained breathing apparatus, or other similar types of apparatus to indicate the direction the user of the apparatus is facing or moving. As such, the scope of the instant disclosure is intended to include all types and kinds of self-contained breathing apparatus and protective face masks, rather than just those used in firefighting. A DI 100 can also be used with helmets having a face shield, e.g., for motorcyclists, snowmobilers, and other activities.

A number of illustrative embodiments have been described. Nevertheless, it will be understood that various modifications may be made without departing from the spirit and scope of the instant disclosure and various embodiments presented herein. For example, various approaches can be used to indicate a low-battery status to the user, such as by flashing the at least one indicator repeatedly or, in the case of the DI 100 illustrated in FIG. 2, for example, by flashing each of the N, S, E, W indicators in a circular pattern, or by flashing all of the indicators at once. A DI of the type described herein can be used in professions other than firefighting. For example, police and SWAT teams commonly use face shields to protect themselves from harm, and such professionals also commonly chase suspects on foot. In such a circumstance, a DI can be used on the inside of an officer's face shield so that he or she can give updates to fellow officers or dispatch as to a direction of pursuit. While firefighting has generally been discussed herein from the aspect of structural firefighting, a DI 100 can be used in forest firefighting activities. Accordingly, other embodiments are within the scope of the following claims.

What is claimed is:

1. A directional indicator, comprising:
a microcontroller in signal communication with at least an electronic compass and an accelerometer;
a plurality of individually-actuatable light sources arranged such that the position of each light source represents a unique compass direction, wherein each of said light sources is actuatable by said microcontroller to controllably emit light;
at least one power source providing power to at least said microcontroller; and
a shock sensor in signal communication with said accelerometers;
wherein said shock sensor sends a wake-up signal to said accelerometer upon receiving a percussive shock when said directional indicator is in said powered-down, standby or sleep mode.

2. The directional indicator of claim 1, wherein said directional indicator is operable to toggle between a powered-down, standby or sleep mode and a full-power, operating mode.

3. The directional indicator of claim 2, wherein at least one of said microcontroller, said electronic compass and said accelerometer are powered off after a selected time interval of inactivity as measured by said accelerometer.

4. The directional indicator of claim 2, wherein each of said microcontroller, said electronic compass and said accelerometer are powered off after a selected time interval of inactivity as measured by said accelerometer.

5. The directional indicator of claim 1, wherein a tap by a user's finger is a percussive shock suitable to cause said shock sensor to send said wake-up signal to said accelerometer.

6. The directional indicator of claim 1, wherein said wake-up signal causes said accelerometer to switch from said standby mode to said operating mode.

7. The directional indicator of claim 6, wherein said accelerometer remains in said operating mode for a preselected time interval after receiving said wake-up signal.

8. The directional indicator of claim 7, wherein, if movement of said directional indicator is measured by said accelerometer within said preselected time interval, said directional indicator toggles to said full-power, operating mode, wherein at least said microcontroller, said electronic compass and said accelerometer are operative.

9. The directional indicator of claim 8, wherein said movement is a predetermined confirmatory motion.

10. The directional indicator of claim 9, wherein said predetermined confirmatory motion is a nodding motion of the head of a user, when said directional indicator is attached to an implement worn on said head of said user.

11. The directional indicator of claim 10, wherein said implement is a facemask or face shield.

12. The directional indicator of claim 7, wherein, if no movement signals are generated by said accelerometer within said preselected time interval, said accelerometer is powered off and said directional indicator reverts to said standby mode.

13. The directional indicator of claim 7, wherein said preselected time interval is:
between about 1 second and about 2 seconds;
between about 1 second and about 4 seconds; or
between about 1 second and about 10 seconds.

14. The directional indicator of claim 1, further comprising a rear housing portion and a front housing portion reversibly engaged to one another so as to encapsulate at least said microcontroller in a waterproof configuration.

15. The directional indicator of claim 14, wherein said front housing portion comprises an aperture for each light source, for allowing light emitted from said light sources to be visible from the exterior of said directional indicator.

16. The directional indicator of claim 14, wherein said front housing portion comprises a number of integral, transparent or translucent windows equal to the number of light sources for allowing light emitted from said light sources to be visible from the exterior of said directional indicator.

17. The directional indicator of claim 16, wherein each of said transparent or translucent windows is formed as a shape that indicates the unique compass direction associated with the light source immediately adjacent thereto.

18. The directional indicator of claim 1, wherein said microcontroller is configured to receive a heading direction signal from said electronic compass corresponding to the direction said directional indicator is pointing and activate at least one of said light sources corresponding to said heading direction.

19. A directional indicator, comprising:
a microcontroller in signal communication with at least an electronic compass and an accelerometer;
a display, in signal communication with said microcontroller, operable to show indicia corresponding to a heading direction of said directional indicator determined by said electronic compass;
at least one power source providing power to at least said microcontroller; and
a shock sensor in signal communication with said accelerometer,
wherein said shock sensor sends a wake-u signal to said accelerometer upon receiving a percussive shock when said directional indicator is in said standby mode.

20. The directional indicator of claim 19, wherein said directional indicator is operable to toggle between a low- or no-power, standby mode and a full-power, operating mode.

21. A directional indicator, comprising:
a microcontroller in signal communication with at least an electronic compass and an accelerometer;
a plurality of individually-actuatable light sources arranged such that the position of each light source represents a unique compass direction, wherein each of said light sources is actuatable by said microcontroller to controllably emit light;
at least one power source providing power to at least said microcontroller; and
a shock sensor in signal communication with said accelerometer;
wherein at least one of said microcontroller, said electronic compass and said accelerometer are configured to enter a powered-off state after a predetermined amount of time after said accelerometer has not registered motion;
wherein said shock sensor is configured to send a wake-up signal to said accelerometer after receiving a percussive shock sufficient to trigger said shock sensor, thereby causing said accelerometer to monitor for a predetermined confirmatory motion; and
wherein said accelerometer is configured to recognize said predetermined confirmatory motion and:
if recognized, causes said directional indicator to toggle from said powered-off state to a fully powered-on state;
if not recognized, said accelerometer reverts to said powered-off state.

* * * * *